Sept. 7, 1965

P. W. YAWN 3,204,712

AUTOMATIC WEIGHING SCALE

Filed Feb. 5, 1964

INVENTOR.

PRESTON W. YAWN.

Sept. 7, 1965 P. W. YAWN 3,204,712
AUTOMATIC WEIGHING SCALE
Filed Feb. 5, 1964 4 Sheets-Sheet 2
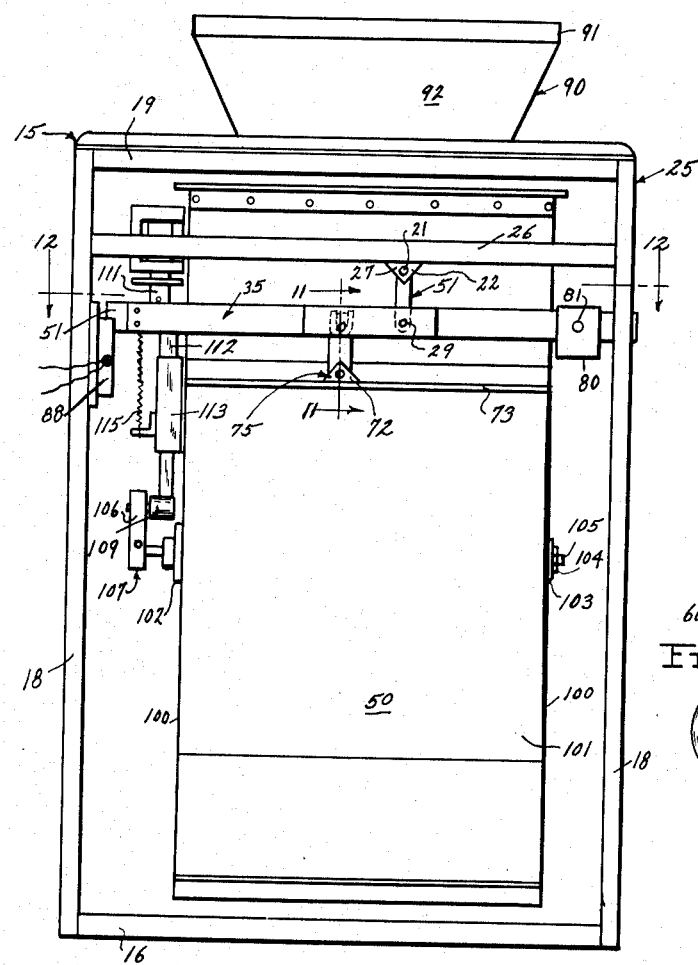
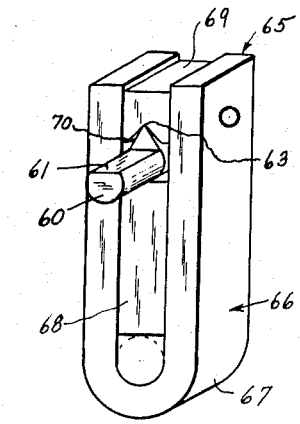
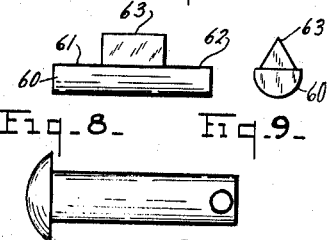
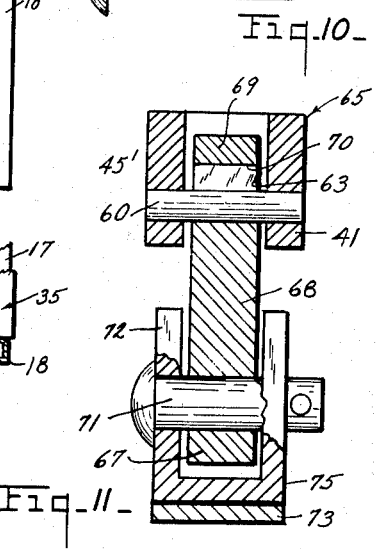
INVENTOR.
PRESTON W. YAWN.

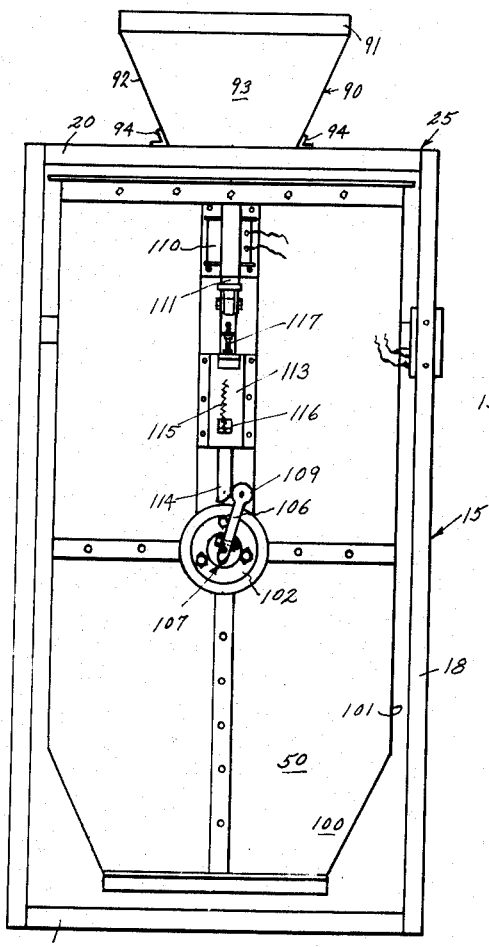
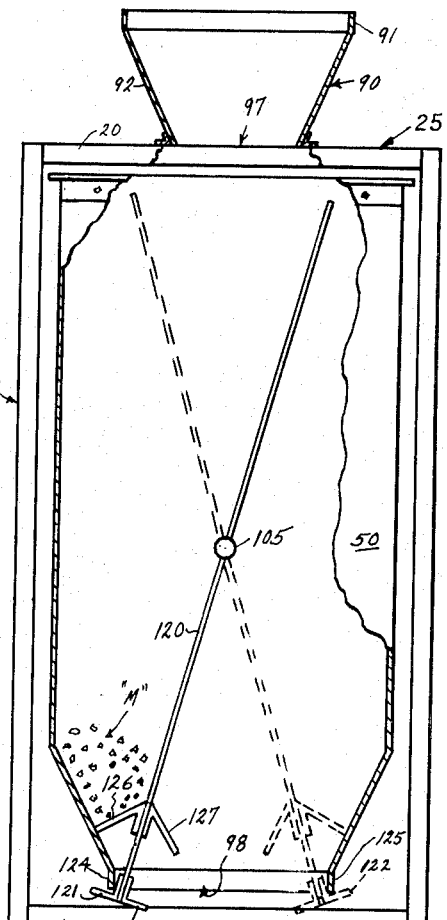
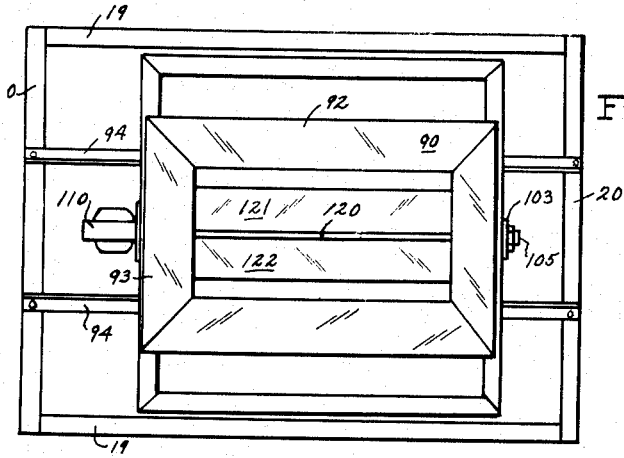

Sept. 7, 1965  P. W. YAWN  3,204,712
AUTOMATIC WEIGHING SCALE
Filed Feb. 5, 1964  4 Sheets-Sheet 4
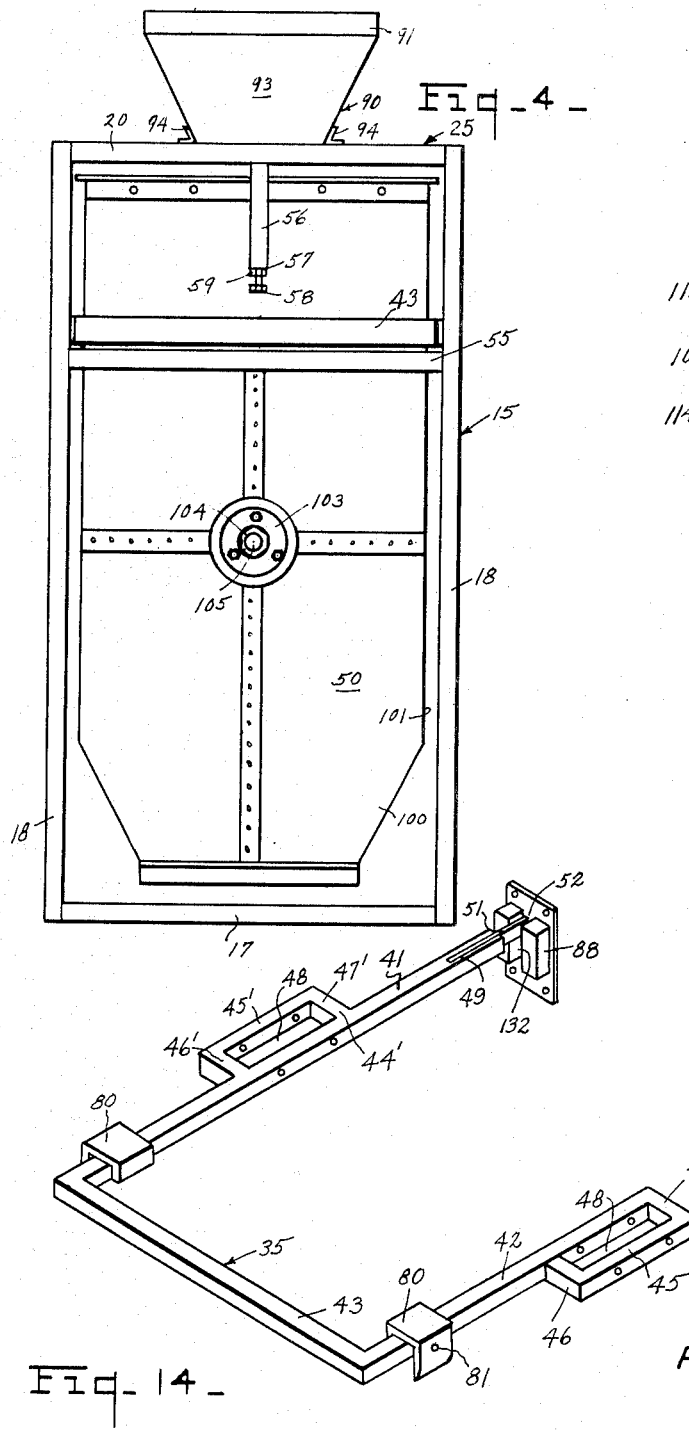
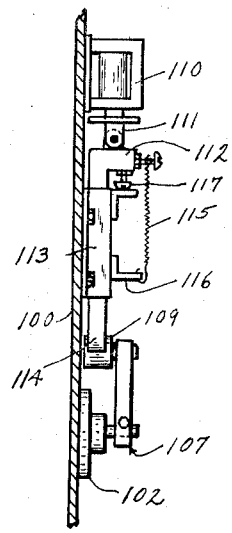
INVENTOR.
PRESTON W. YAWN.

United States Patent Office 3,204,712
Patented Sept. 7, 1965

3,204,712
AUTOMATIC WEIGHING SCALE
Preston W. Yawn, Canton, Miss., assignor of one-half to
Noland W. Yawn, Canton, Miss.
Filed Feb. 5, 1964, Ser. No. 342,612
6 Claims. (Cl. 177—92)

This invention relates to improvements in automatic material weighing machines.

A principal object of the invention is to provide a simple and improved form of material weighing and batching machine arranged with a view toward utmost accuracy in weighing and simplicity and efficiency in high speed operation.

Another object of the invention is to provide a simplified and improved form of cotton seed and/or granular material weighing and batching machine on which a weigh hopper is balanced in a weighing and filling position by weighing mechanism, and in which overbalancing of the weight mechanism caused by filling of the weigh hopper with material instigates the swinging of the cut off gate valve within the hopper and the removal of the material from the hopper for delivery to a conveyor or container or to another machine for further processing.

A still further object of the invention is the provision of such a machine which can be made quickly and easily from readily available materials which require a minimum of processing or machining for assembly into the finished product so that it can be sold at an economical and competitive price.

A still further object relates more particularly to that class of apparatus wherein the flow of material such as cotton seeds, shell corn, and granular materials, wherein the flow of the material into the weigh hopper supported by the weighing mechanism, operates a swingably mounted beam, which, through the medium of suitable electrical translating devices, controls the opening and shutting of a gate, which in turn controls the passage of material being weighed.

These and other objects of the invention will appear from time to time as the following specification proceeds and with reference to the accompanying drawings wherein:

FIGURE 2 is a rear elevational view of the weighing machine shown in FIG. 1;

FIGURE 3 is an end elevational view of the machine showing specifically the hopper, the trip lever and the solenoid attached thereto, along with some of the parts operated thereby;

FIGURE 4 is an elevational view of the machine specifically showing the bearing for gate valve shaft;

FIGURE 5 is an end elevational view as shown by FIG. 4, with the side wall of the hopper broken away showing the gate valve in one closed position, and by dotted lines in a second position;

FIGURE 7 is a perspective view of a structural detail of the clevis assembly arranged with the weigh hopper of the machine;

FIGURES 8, 9 and 10 are views of structural details;

FIGURE 11 is a sectional view taken on line 11—11 of FIGURE 2;

FIGURE 12 is a fragmentary sectional view taken on line 12—12 of FIG. 1, showing the weigh beam, the electric switch and vane associated therewith;

FIGURE 14 is a fragmentary perspective view of the U-shaped weigh beam, the electric switch and vane associated therewith.

FIGURE 16 is a plan view of the weighing scale of FIGURE 1.

Figure 1:
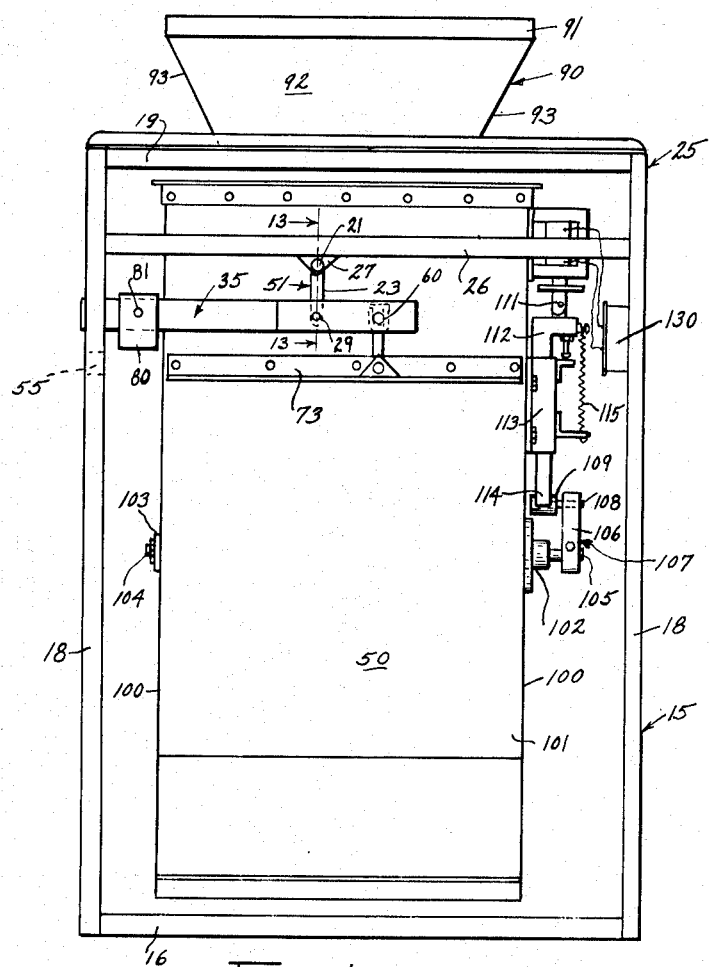
FIGURE 1 is a front elevational view of the weighing machine constructed in accordance with the present invention.
Figure 13:
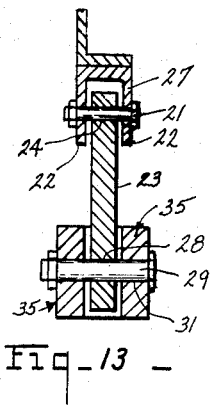
FIGURE 13 is a fragmentary sectional view taken on line 13—13 of FIG. 1.

In the embodiment of the invention illustrated in the drawings, I have shown an automatic weighing machine 15, including a supporting frame of structural members, such as angle irons, comprising a rectangular base having side members 16 and end members 17. At the corners thereof vertical posts 18 are erected to support a top marginal frame 25 having side members 19 and end members 20 formed of similar transverse and longitudinal structural members suitably secured together and to the posts, as by welding. Just below the two longitudinal side members 19 of the marginal frame 25, angle iron support members 26 are welded to the corner posts 18 providing suitable distance therebetween. An inverted U-shaped channel type bracket 27 is secured intermediate the ends of said support members 26 with its side flanges 22 extending downwardly—see FIGS. 2 and 13. A material weighing hopper 50 is supported from the brackets 27 by headed pins 21 projecting through openings in the side flanges 22 of brackets 27, the pins 21 supporting a pair of depending bars 23 arranged with their upper ends between said flanges 22, the pins extending horizontally through holes 24 in the upper ends of said bars 23. The lower ends of said bars 23 have holes 28 arranged therethrough. The lower ends of said bars 23 are assembled between the side walls of the weigh beam 35, headed cylindrical pins 29 extended through said holes 28 in bar 23 and through holes 31 in said weigh beam 35, said bracket 27, bar 23, pins 21 and 29 forming a clevis assembly 51 between said members 26 and weigh beam 35; the said pins 29 being carried by the weigh beam 35 a short distance from the free ends thereof, one on each side of the hopper 50, as will be understood by those skilled in the art. The weigh beam 35 is substantially U-shape in configuration with one arm 41 being longer than the second arm 42, integrally connected with its common cross member 43. The short arm 42 is formed at its free end with a rectangular frame member 44 with a side bar 45 spaced therefrom and parallel therewith, connected at the ends by bars 46 and 47, the long arm 41 being formed with a rectangular frame member 44', with a side bar 45' and end bars 46' and 47', both frame members 44 and 44' being of the same distance from the common cross member 43. Each frame member 44 and 44' having a rectangular shaped opening, referred to by numeral 48, the weigh beam 35 being assembled close to the sides and one end wall of the hopper 50, with the rectangular openings 48 directly below the side members 26 whereby said clevis assembly 51 will function therewith. The said longer arm 41 of the weigh beam 35 extends beyond the end of the hopper 50 and is formed with a longitudinal vertical slot 49 therein. A rectangular shaped vane 51 is assembled within said slot 49 with its free end 52 extending longitudinally therefrom. A vane operating electric switch 88 is secured to the inside wall of one vertical post 18, adjacent the free end 52 of said longer arm 41, later to be described. Just below the end member 20, at the right end of the machine 15, as viewed by FIG. 1, is an angle support member 55 welded to the corner posts 18; a rigid post 56 being arranged vertically between said end member 20 and said support member 55, its upper end being welded to said member 20 midway between its ends and its lower end 57 spaced above said member 55 at a desired distance; a headed screw 58 threaded in the said lower end 57 with a lock nut 59 screwed thereon forming a means to lengthen the effective length of post 56.

The weigh beam 35 carries another pivot pin 60 in each frame member 44 and 44' at one end thereof adjacent the pins 29 but closer to the free ends of arms 41 and 42. The pins 60 are not cylindrical like pins 29 but have flat upper end portions 61 and 62 with a knife edge portion 63—see FIGS. 7, 8 and 9, the knife edge thereof extending upwardly. A second clevis assembly 65 is supported from the pivots 60, the assembly having a U-shaped body 66 having a closed bottom 67, a centrally located block 68 and a grooved bearing block 69 closing the upper end thereof, the said bearing block 69 having an inverted V-shaped groove 70 in the lower portion thereof, the top of the knife edge of pin 60 being in supporting contact with the apex portion of the V-shaped groove 70 when assembled therewith. The body 66 supports a cylindrical headed pin 71 between the block 68 and the closed bottom 67, the ends of said pin 71 extending through side flanges 72 of a U-shaped bracket 75 rigidly secured to transverse angle iron support members 73 riveted to the side walls of the hopper 50—see FIGS. 1 and 2.

A counter balance 80 for the hopper 50 is slidably mounted on the arms 41 and 42 adjacent to the cross-member 43, and adjustably fixed thereto by screws 81, see FIG. 14; and when the hopper is empty, the cross-member 43 normally rests on the support member 55 at one end of the frame. Undue upward travel of the weigh-beam 35 is prevented by the head on the screw 58 in post 56 forming a stop when arranged a suitable distance above the cross-member 43. The distance between the headed screw 58 and the support member 55 serves to limit the travel of the weigh beam and the hopper in its movements during and after a charge.

The hopper 50 is open at the top and bottom, but closed at the bottom during the filling operation thereof by a swinging gate 120. A feed-hopper 90 is supported above the weigh-hopper 50 to guide the material to be weighed into said weigh hopper. Said hopper 90 has a rectangular shaped upper, or top frame 91 with inwardly and downwardly shaped side walls 92 and end walls 93. Two supporting bars 94 are secured to and supported by the end members 20 of frame 25; said bars 94 spaced apart a distance equal to the bottom width of said feed-hopper whereby the lower side walls 92 of the feed-hopper are rigidly secured to said bars 94, thus making a rigid assembly with said frame 25.

The weigh hopper 50 is generally a housing constructed of sheet metal, suitably strengthened by iron bars about the upper and lower openings and wherever the walls need rigidity. The two narrow end walls 100 of the hopper 50 extend vertically from top to bottom limits thereof. The front walls 101 are wider and have the upper and central portions arranged vertically, but with the lower longitudinal portion formed inwardly meeting the inwardly tapered edge portion of the end walls 100; thereby providing a rectangular outlet opening 98 smaller than the inlet opening 97 thereof. The end walls 100 of the hopper 50 have circular plate type bearings 102 and 103 secured thereto intermediate the top and lower limits thereof and midway between the front and rear wall edges thereof; said bearings 102 and 103 having outwardly extending hub portions integrally formed therewith. A pivot shaft, or valve gate shaft 105 extends entirely through the hopper with the ends thereof journalled within said bearings 102 and 103. A nut 104 is threaded on the end of said shaft 105 adjacent said bearing 103 while an operating arm 106 is bolted upon the opposite end of said shaft 105 adjacent bearing 102 by bolt and nut assembly 107. The free end of arm 106 has a transverse bore therethrough, a bearing headed bolt 108 is assembled in said bore allowing a roller 109 to extend towards and adjacent the side wall 100 of the hopper 50. As clearly shown by FIGURES 3 and 12, an electric solenoid assembly 110 is rigidly secured to the end wall 100 of the hopper 50, midway between the side edges thereof, and directly over the bearing 102 supporting said gate shaft 105. A solenoid plunger 111 extends downwardly from the solenoid and has a bifurcated lower end with transverse holes therethrough. An inverted L-shaped arm 112 is movably and vertically mounted upon the side wall of hopper 50 by a hollow vertical tubing 113 rigidly secured thereto. The vertical free end 114 of said arm 112 extends downwardly and forms a trip lever, preventing oscillation of said arm 106 and shaft 105. The L-shaped arm 112 is held in its lower position by a resilient tension spring 115 having its lower end connected to an angle iron 116 secured to said tubing 113 and its upper end connected to a pin screwed into the upper horizontal portion of arm 112. A stop 117 consisting of a headed screw and lock nut assembled with said arm 112 is operable to strike a stop plate on said tubing 113, thereby controlling the downward portion of the vertical free end 114 of arm 112. When the solenoid pulls its plunger upwardly, then the strip lever is raised and the free end 114 thereof is raised thereby allowing the roller 109 to pass thereunder, permitting oscillation of said arm 106.

As seen by the drawing, a gate valve 120 is mounted upon the gate valve shaft 105. Said valve 120 consists of a flat, rectangular shaped, metal plate which is substantially as wide as the inside longitudinal length of the weigh hopper 50, and it extends substantially from the inlet and through the outlet thereof, see FIGURES 5 and 16. The valve 120 has a pair of angle irons 121 and 122 rigidly secured to the lower end thereof, the iron 121 on one side and the iron 122 on the opposite side thereof, whereby iron 121 will contact the lower edge 124 of the outlet in one position and iron 122 contact the lower edge 125 on the opposite side of the outlet of the hopper when the gate is oscillated to the opposite side of the hopper. In order to keep the material "M" being weighed from wedging between the irons 121 and 122 and the outlet walls, and also to assist in turning the gate valve due to weight of material being weighed, a pair of angle plates 126 and 127 are secured to the lower end section of the gate valve, on opposite sides, and extend to and contact the inside slanting wall of the hopper when the valve is moved adjacent the wall. The plates 126 and 127 are formed to provide an upper obtuse angle of 135 degrees with the gate valve and due to the slant wall of the hopper, the plate forms substantially a 90 degree angle therewith. The weight of the material upon the plate and wedging thereof against the wall of the hopper and the gate valve, it will turn the gate valve 120 and shaft 105; pressure upon plate 126 turns the valve 120 in counter-clock-wise direction, while pressure on plate 127 turns the valve 120 in a clockwise direction within the lower end of hopper 50—see FIGURES 5 and 16.

Figure 15:
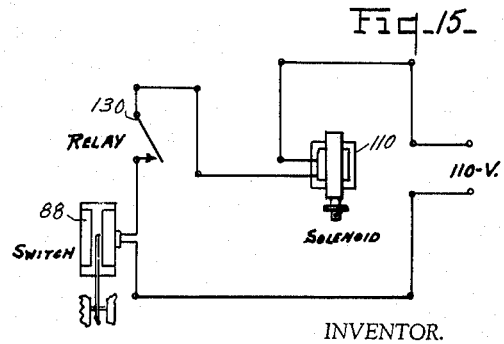
FIGURE 15 is a schematic diagram of the electrical control system employed in the weighing machine of this invention.
Figure 6:
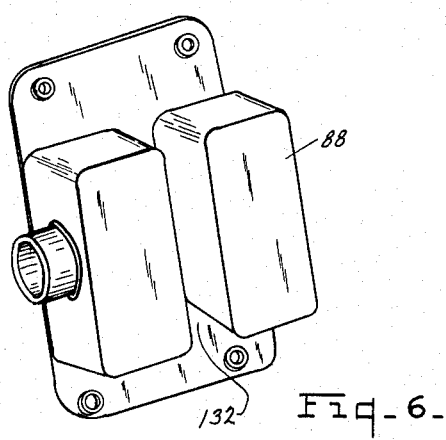
FIGURE 6 is a perspective view of a vane operated limit switch which controls the operation of the solenoid and associated parts on the machine.

FIGURE 15 illustrates a line-to-line circuit diagram of the electrical control system employed. This type of diagram best illustrates the mode of operation, and in order to show with clarity the relation of the solenoid, switch and relay to their associated contacts, each element is given a reference numeral and name for identification. The current is received from 110-volt lines, travels to switch 88 which is energized by movement of vanes 51 attached to the weigh arm 35; this closes relay 130, and energizes the solenoid 110 to withdraw the solenoid plunger 111.

The switch 88 is referred to as a vane operated elevator limit switch, made by General Electric Company—Serial No. CR115A30, front operated, and functions in connection with a General Electric CR2700 E. Relay. The switch 88 has a body embodying a longitudinal slot 132 extending through the entire outer surface portion thereof, the switch operating without physical contact of levers or rods; it operates by passing a mild steel vane 51, attached to that free end portion of arm 41 of weigh beam 35, into the slot. The switch is mounted on the machine frame so that the vane will pass freely through the switch slot; the switch contact will operate when the vane has progressed approximately ⅔ of the distance through the slot.

In operation, as a charge of material flows by gravity from a suitable supply source into the hopper, it falls against the gate valve 120 and pressure plates 126, as shown by full lines of FIG. 5, and is supported within the hopper 50 until a predetermined weight of material has entered the hopper sufficient to overbalance the counterweights 80. When this occurs, the weigh beam 35 pivots on pin 21, lifting its cross-arm 43 off the support member 55, allowing the hopper 55 to move downwardly, and also allowing the free end of arm 41 with vane 51 attached thereto to move downwardly, the vane passing into the slot 132, operating the switch 88 and solenoid 110, pulling up the plunger 111 attached to the lever 112. As the lever 112 moves upwardly, the lower end 114 thereof allows roller 109 to pass thereunder, allowing arm 106, shaft 105 to pivot and allowing the gate valve 120 to oscillate to the opposite side of the hopper, as shown in FIG. 5 by dotted lines; the angle iron 122 will now contact the side wall 125 closing the outlet; the upper end of the gate valve 120 swinging to the opposite side of the inlet and directing the flowing material to the opposite side of the hopper 50. As soon as the gate valve 120 is moved to the opposite side, some of the material flows out of the hopper, thus reducing the weight therein and allowing the counterweights 80 to overbalance the hopper and return the weigh beam with cross bar 43 to rest on the support member 55. The gate valve 120 meanwhile has fully opened and discharged its load, and under the influence of its own counterweights 80, allows weighing of a new batch of material without loss of time. While the weigh beam is at rest, the electric switch is open, since the vane 51 moved out of slot 132 of switch 88. With the circuit broken, the plunger of the solenoid is pulled downwardly by the tension spring 115, thus moving the lower end 114 of lever 112 into gate valve locking position.

While the foregoing describes a preferred embodiment of the invention, changes in design, construction and arrangement of parts may be made without departing from the spirit and scope of the novel concepts thereof.

I claim as my invention:

1. A weigh scale comprising a frame, a U-shaped weigh beam having two arms and a common cross member, said weigh beam pivotally supported on said frame, a weigh hopper pivotally supported on the arms of said weigh beam, said hopper having front and rear walls and two end walls, a pivot shaft journalled in bearings mounted upon both of said end walls intermediate the upper and lower ends thereof, a gate valve rigidly mounted intermediate its ends upon said pivot shaft within said hopper allowing said gate valve to oscillate between the side walls of said hopper, an upstanding operating arm secured to one end of said pviot shaft with a roller on the upper end thereof, a trip lever vertically and slidably mounted upon the end wall of said hopper adjacent to and above said pivot shaft with its lower end lockingly engageable with said roller on said arm, means operative by lowering movement of said hopper for effecting upward movement of said trip lever and release of said arm and said pivot shaft and open said gate valve and discharge the load; said means comprising a switch mounted on said frame, a solenoid mounted upon said hopper and connected with said trip lever, and an operating circuit connecting said switch and solenoid and a device for controlling the period of operation of said solenoid in accordance with the movement of said weigh beam; and other means to move said trip lever toward a low normal position to lockingly engage said roller.

2. A weigh scale comprising a frame, a U-shaped weigh beam having two arms and a common cross member, said weigh beam pivotally supported on said frame, a weigh hopper pivotally supported on the arms of said weigh beam, said hopper having front and rear side walls and two end walls, a pivot shaft journalled in bearings mounted upon both of said end walls intermediate the upper and lower ends thereof, a gate valve rigidly mounted intermediate its ends upon said pivot shaft within said hopper allowing said gate valve to oscillate between the side walls of said hopper, an upstanding operating arm secured to one end of said pivot shaft with a roller on the upper end thereof, a trip lever vertically and slidably mounted upon the end wall of said hopper adjacent to and above said pivot shaft with its lower end lockingly engageable with said roller on said arm, means operative by lowering movement of said hopper for effecting upward movement of said trip lever and release of said arm and said pivot shaft and open said gate valve and discharge the load; said means comprising a switch mounted on said frame, a solenoid mounted upon said hopper and connected with said trip lever, and an operating circuit connecting said switch and solenoid and a device for controlling the period of operation of said solenoid in accordance with the movement of said weigh beam; and means for moving said trip lever toward a lowermost position comprising a tension spring connected at its upper end to the upper end portion of said trip lever and the lower end of said spring connected indirectly to said hopper below the upper end of said lever, and said switch mounted upon said frame consisting of a body with an external vertical slot therein and operable by movement of a metal vane movable within said slot.

3. A weigh scale comprising a frame, a U-shaped weigh beam having two arms and a common cross member, one of said weigh beam arms being longer than the second arm, the shorter arm formed at its free end with a rectangular frame member embodying a side bar spaced therefrom and parallel therewith, the longer arm being formed with a rectangular frame member intermediate its ends embodying a side bar spaced therefrom and parallel therewith, said two rectangular frame members being of the same distance from said common cross member, a pair of clevis type means, said weigh beam being pivotally supported by said clevis type means connected at their ends to said frame and at their lower ends to said rectangular frame members, a weigh hopper pivotally supported to said rectangular members of the arms of said weigh beam, said hopper having front and rear side walls and two end walls, said end walls having downwardly and inwardly tapered lower end edge portions, the lower end sections of said front and rear walls formed inwardly and downwardly and joined with said inwardly tapered lower edge portions of said end walls, a pivot shaft joined in bearings mounted upon both of said end walls intermediate the upper and lower ends thereof, a gate valve rigidly mounted intermediate its ends upon said pivot shaft within said hopper allowing said gate valve to oscillate between the side walls of said hopper, a pair of angle plates secured to the lower end section of the gate valve on opposite sides thereof and extending outwardly therefrom effecting contact with one of the inside slanting walls of the hopper when the valve is moved adjacent one of the inwardly and downwardly lower ends of said lower sections of said front and rear walls thereby forming material supporting members, an upstanding operating arm secured to one end of said pivot shaft with contact means on the upper end thereof, an inverted L-shaped trip lever vertically and slidably mounted in a hollow vertical tubing rigidly secured upon one of the end walls of said hopper to and above said pivot shaft with its lower end lockingly engageable with said contact means on said arm, means operative by lowering movement of said hopper for effecting upward movement of said trip lever and release of said arm and said pivot shaft and open said gate valve and discharge the load; said means comprising a switch mounted on said frame, a solenoid mounted upon said hopper and connected with said trip lever, and an operating circuit connecting said switch and solenoid and a device for controlling the period of operation of said solenoid in accordance with the movement of said weigh beam; and other means to move said trip lever toward a low normal position to lockingly engage said roller.

4. The structure of claim 3 wherein said means for moving said inverted L-shaped trip lever toward a lowermost position comprises a tension spring connected at its upper end to the upper horizontal end portion of said inverted L-shaped trip lever and with the lower end of the spring connected to the external surface of the lower end portion of said hollow vertical tubing secured to said hopper at a location below the upper end of said inverted L-shaped trip lever, and said switch mounted upon said frame consisting of a body with an external vertical slot therein and operable by movement of a metal vane connected with the free end of said longer second arm and movable within said slot.

5. A weigh scale having a frame and a U-shaped weigh beam having two arms and a common cross member, comprising
    (a) means pivotally mounting said weigh beam on said frame,
    (b) a hopper pivotally mounted on the two arms of said weigh beam, said hopper embodying front and rear side walls and two end walls integrally secured together for holding a predetermined load therein,
    (c) a pivot shaft journalled in bearings mounted upon both the said end walls, the bearings located intermediate the upper and lower ends of said end walls and the ends of said pivot shaft extending through said end walls,
    (d) a gate valve rigidly mounted intermediate its ends upon said pivot shaft inside said hopper,
    (e) an upstanding operating arm rigidly secured at its lower end to one end of said pivot shaft which extends outside said hopper, said arm having a roller movably mounted upon its upper end,
    (f) a trip lever vertically and slidably mounted within a hollow tubing mounted vertically upon the exterior of one of said hopper end walls adjacent said operating arm and above said pivot shaft and controlling the movement of said operating arm and said pivot shaft,
    (g) control means operative by lowering movement of said hopper for effecting upward movement of said trip lever and release of said operating arm and said pivot shaft and further allowing movement of said gate valve and release of the load within said hopper,
    (h) said control means comprising a switch mounted on said frame, a solenoid mounted upon said hopper and connected with said trip lever and an operating circuit connecting said switch and solenoid together,
    (i) a device for controlling the period of operation of said solenoid in accordance with the movement of said weigh beam,
    (j) and a resilient coil spring type means connected at its lower end to said hopper and at its upper end to said trip lever effecting downward movement of said trip lever to a low normal position and into lockingly engagement with said roller on said operating arm thereby preventing movement of said operating arm after return of the hopper to its normal upper position.

6. A weigh scale having a frame and a U-shaped weigh beam having two arms of unequal length and a common cross member, comprising,
    (a) means pivotally mounting said weigh beam in a normal upper position on said frame,
    (b) a hopper pivotally mounted on the two arms of said weigh beam, said hopper open at the upper end and embodying closed front and rear side walls and two end walls integrally secured together for holding a predetermined load therein,
    (c) a pivot shaft journalled in bearings mounted upon both the said end walls and intermediate the upper and lower ends thereof, said pivot shaft having one end extending outside said hopper,
    (d) an oscillating type gate valve arranged inside said hopper and rigidly mounted intermediate its ends with said pivot shaft effecting a movable bottom closure for said hopper,
    (e) an upstanding operating arm rigidly secured at its lower end to the end of said pivot shaft extending outside said hopper and having a contact surface means at its upper end,
    (f) a trip lever vertically and slidably mounted on the exterior surface of said hopper end wall adjacent and above said operating arm normally maintained in a lower position for controlling the movement of said operating arm and said pivot shaft,
    (g) switch control means comprising a switch mounted on said frame and a solenoid mounted on said hopper and connected with said trip lever,
    (h) an operating circuit connecting said switch and said solenoid,
    (i) a device secured to the free end of the longer arm for controlling the period of operation of said solenoid in accordance with the movement of said weigh beam,
    (j) and a resilient means effecting downward movement of said trip lever to its normal lower position after return of said weigh beam to its normal upper position.

References Cited by the Examiner
UNITED STATES PATENTS

| | | | |
|---|---|---|---|
| 490,957 | 1/93 | Fulwider | 177—92 |
| 644,267 | 2/00 | Wilken | 177—92 |
| 834,446 | 10/06 | Berg | 177—92 X |
| 1,039,471 | 9/12 | Adams | 177—92 |
| 1,308,882 | 7/19 | Van Pelt | 177—92 X |
| 2,842,330 | 7/58 | Hopkins | 177—113 X |

FOREIGN PATENTS

| | | |
|---|---|---|
| 42,488 | 7/33 | France. |

LEO SMILOW, *Primary Examiner.*